US011188949B2

(12) United States Patent
Eustace et al.

(10) Patent No.: US 11,188,949 B2
(45) Date of Patent: Nov. 30, 2021

(54) SEGMENT CONTENT OPTIMIZATION DELIVERY SYSTEM AND METHOD

(71) Applicant: Get Smart Content, Inc., Austin, TX (US)

(72) Inventors: James Eustace, Austin, TX (US); Michael Hovey, Austin, TX (US)

(73) Assignee: Persona IP Licensing, LLC

( * ) Notice: Subject to any disclaimer, the term of this patent is extended or adjusted under 35 U.S.C. 154(b) by 214 days.

(21) Appl. No.: 14/621,569

(22) Filed: Feb. 13, 2015

(65) Prior Publication Data

US 2015/0227983 A1    Aug. 13, 2015

Related U.S. Application Data

(63) Continuation-in-part of application No. 14/463,293, filed on Aug. 19, 2014, now Pat. No. 10,235,694, (Continued)

(51) Int. Cl.
  *G06Q 30/02*    (2012.01)
  *G06F 16/835*   (2019.01)
  *H04W 4/21*     (2018.01)

(52) U.S. Cl.
  CPC ..... *G06Q 30/0269* (2013.01); *G06F 16/8373* (2019.01); *G06Q 30/0204* (2013.01); *G06Q 30/0243* (2013.01); *H04W 4/21* (2018.02)

(58) Field of Classification Search
  CPC .................................................. G06Q 30/0269
  See application file for complete search history.

(56) References Cited

U.S. PATENT DOCUMENTS 7,966,333 B1    6/2011   Uppala
7,925,549 B2   12/2011   Looney et al.
(Continued)

FOREIGN PATENT DOCUMENTS

WO        2000062184 A2    10/2000

*Primary Examiner* — Dawaune A Conyers
(74) *Attorney, Agent, or Firm* — The Law Firm of H. Dale Langley, Jr., P.C.

(57) ABSTRACT

A method for identifying segments of a population of user devices communicating on a communications network. The segments correspond to user devices of the population exhibiting comparable behavioral patterns detectable by the communications network. A plurality of marketing systems are accessible on the communications network, and each of the plurality of marketing systems include respective use data corresponding to respective ones of the population for the marketing system. The method includes retrieving by a processor the respective use data for the population, from the plurality of marketing systems, determining by the processor if the respective use data exceeds a threshold for particular behavioral pattern of interest, for the respective use data, determining by the processor a unique identifier for each user device of the use data, grouping by the processor in a database, the respective use data in relation to the unique identifier, for each user device of the use data that exceeds the threshold, and mapping by the processor in the database, the behavioral pattern of the respective use data for each user device of the use data that exceeds the threshold. Behavioral patterns are determined for the respective segment, and related to the user devices of the segment. Content for delivery to the segment is sequenced, and placeholder in the sequence is stored in relation to each user device of the segment, to ensure that each next sequential content is delivered to the respective user device.

17 Claims, 7 Drawing Sheets

Related U.S. Application Data which is a continuation of application No. 12/699,164, filed on Feb. 3, 2010, now Pat. No. 8,849,847.

(56) References Cited

U.S. PATENT DOCUMENTS

| | | |
|---|---|---|
| 8,510,658 B2 | 8/2013 | Priyadarshan et al. |
| 2005/0027593 A1* | 2/2005 | Wilson ............... G06Q 30/0269 |
| | | 705/14.53 |
| 2006/0259357 A1 | 11/2006 | Chiu |
| 2008/0275764 A1* | 11/2008 | Wilson .................. G06Q 30/02 |
| | | 705/7.34 |
| 2009/0070129 A1* | 3/2009 | Inbar ...................... G06Q 30/02 |
| | | 705/317 |
| 2009/0164310 A1* | 6/2009 | Grossman .......... G06Q 20/3224 |
| | | 705/7.33 |
| 2010/0119053 A1* | 5/2010 | Goeldi .................. G06Q 10/00 |
| | | 379/265.09 |
| 2010/0185630 A1* | 7/2010 | Cheng .................... H04L 51/32 |
| | | 707/756 |
| 2010/0228625 A1* | 9/2010 | Priyadarshan ......... G06Q 30/02 |
| | | 705/14.49 |
| 2010/0262487 A1* | 10/2010 | Edwards ................ G06Q 30/02 |
| | | 705/14.43 |
| 2010/0318427 A1* | 12/2010 | Miranda ............ G06Q 30/0251 |
| | | 705/14.66 |
| 2011/0029383 A1* | 2/2011 | Engel .................... G06F 3/0488 |
| | | 705/14.53 |
| 2011/0099047 A1* | 4/2011 | Weiss .................... G06Q 10/00 |
| | | 705/7.34 |
| 2011/0137941 A1 | 6/2011 | Hoffman et al. |
| 2012/0042253 A1 | 2/2012 | Priyadarshan et al. |
| 2012/0185503 A1 | 7/2012 | Chamberlain et al. |
| 2014/0006596 A1 | 1/2014 | Merrill |

* cited by examiner

SEGMENT CONTENT OPTIMIZATION DELIVERY SYSTEM AND METHOD

CROSS-REFERENCE TO RELATED APPLICATIONS

The present application is related to and a continuation-in-part of U.S. patent application Ser. No. 14/463,293 titled "Rules-Based Targeted Content Message Serving Systems and Methods", filed Aug. 19, 2014 (which application is a continuation of U.S. patent application Ser. No. 12/699,164, titled "Rules-Based Targeted Content Message Serving Systems and Methods", filed Feb. 3, 2010), which prior patent application is co-pending and has at least one same inventor of the present application.

TECHNICAL FIELD

The present disclosure relates generally to communications networks and devices, and, more particularly, relates to identification of population segments of networked communications devices, such as for targeting messages served to segments of those devices.

BACKGROUND

A population may include segments or portions having relative similarity of characteristics. A characteristic of networked communications devices may include measures of user interaction via the device in a communications network connected to the device. These measures of user interaction are recorded by various systems. These systems include, for example, advertising campaign servers, data management platform systems, email service provider systems, marketing automation platform systems, customer relationship management systems, web analytics provider systems, server log files, social network systems, and others.

Certain conventional marketing systems deliver advertising and marketing content to networked communications devices. These marketing systems are often rules-based, and deliver advertising content according to programmed rules. The advertising content is delivered in sequence or in response to user device requests.

The conventional marketing systems have only limited ability to target content to a desired audience. Often, these marketing systems deliver advertising content to the general public or a portion of that population. Attempts have been made to more selectively target population segments that would be likely to have interest in the advertising content. However, these attempts have not been optimal to obtain higher conversion rates (i.e., the rates at which devices respond on receipt of the advertising content).

It would be advantageous to identify segments of an entire population of user computer devices according to user characteristics for the devices. It would also be advantageous to selectively sequence target advertising content for delivery to select segments of the entire population of such devices. It would further be advantageous to optimize targeted delivery of advertising content to user computer devices among pluralities of media delivery systems, based on respective user characteristics for the respective devices.

SUMMARY

An embodiment of the invention is a system for identifying segments of user devices communicating on a communications network. A plurality of marketing systems are accessible on the communications network. Each of the plurality of marketing systems include respective use data corresponding to respective ones of the user devices for the marketing system. The system includes a behavior collector communicatively connected to the communications network, the behavior collector accesses the plurality of marketing systems and obtains the respective use data of each marketing system, a market tool communicatively connected to the behavior collector, the market tool sorts the use data to derive behavior patterns of corresponding ones of the user devices exhibited by the use data and to group the user devices exhibiting behavior patterns exceeding a threshold of the market tool, and pattern detector communicatively connected to the market tool, the pattern detector maps behavior patterns derived from the use data for the user devices of each group of the user devices exhibiting behavior patterns exceeding the threshold.

In other aspects, the embodiment may include a database is communicatively connected to the behavior collector and the market tool. The database is for storing use data collected from the plurality of marketing systems and for grouping the user devices exhibiting behavior patterns exceeding the threshold of the market tool. In further aspects, the embodiment may include a model content sequencer is communicatively connected to the database, for assigning content for sequential delivery according to grouping of the user devices, and a media optimizer is communicatively connected to the model content sequencer, for determining a preferential communications mode for delivery of the content assigned for sequential delivery per grouping of the user devices.

Another embodiment of the invention is a system for identifying segments of user devices communicating on a communications network. A plurality of marketing systems are accessible on the communications network, and each of the plurality of marketing systems includes respective use data corresponding to respective ones of the user devices for the marketing system. The system includes memory containing a set of instructions, a database for storage of use data and relating patterns of behavior exhibited by the use data with respective groupings of the user devices, and a processor communicatively connected to the communications network, the memory and the database. The processor is for processing the set of instructions including instruction for collecting by the processor, via communicating over the communications network, from each of the plurality of marketing systems, respective use data corresponding to respective ones of the user devices for the marketing system, storing by the processor the respective use data in the database, sorting by the processor the respective use data to identify behavioral patterns common to respective groups of the user devices of the use data, storing by the processor the respective groups in the database, mapping by the processor the behavioral patterns for each of the respective groups based on the use data of the group, and assigning by the processor a sequence of message content for delivery to the user devices of each respective group, based on the mapping of the behavioral patterns for the respective group.

Yet another embodiment of the invention is a method including collecting by the processor, via communicating over the communications network, from each of the plurality of marketing systems, respective use data corresponding to respective ones of the user devices for the marketing system, storing by a processor the respective use data in a database, sorting by the processor the respective use data to identify behavioral patterns common to respective groups of the user devices of the use data, storing by the processor the respective groups in the database, mapping by the processor the behavioral patterns for each of the respective groups based on the use data of the group, and assigning by the processor a sequence of message content for delivery to the user devices of each respective group, based on the mapping of the behavioral patterns for the respective group.

In other aspects, the embodiment may include uniquely identifying by the processor each respective user device of each respective group, storing by the processor a respective unique identifier in the database for each user device, relative to the group of the user device, tracking by the processor status of sequence of message content delivered to each user device, and storing by the processor in the database, relative to each respective unique identifier, status of sequence tracked. In further aspects, the embodiment may include modelling by a media processor sequence of message content based on behavioral patterns of each respective group and storing by the media processor in a media memory each sequence of message content relative to the respective unique identifier for the user devices of the respective group. In event further aspects, the embodiment may include determining by the media processor a respective preferred communication link of the communication network for delivery of message content to respective user devices of the respective group. In yet other aspects of the embodiment, the media processor may be the processor and the media memory may be the memory.

Another embodiment of the invention is a method for identifying segments of a population of user devices communicating on a communications network. The segments correspond to user devices of the population exhibiting comparable behavioral patterns detectable by the communications network. A plurality of marketing systems are accessible on the communications network, and each of the plurality of marketing systems include respective use data corresponding to respective ones of the population for the marketing system. The method includes retrieving by a processor the respective use data for the population, from the plurality of marketing systems, determining by the processor if the respective use data exceeds a threshold for particular behavioral pattern of interest, for the respective use data, determining by the processor a unique identifier for each user device of the use data, grouping by the processor in a database, the respective use data in relation to the unique identifier, for each user device of the use data that exceeds the threshold, and mapping by the processor in the database, the behavioral pattern of the respective use data for each user device of the use data that exceeds the threshold.

BRIEF DESCRIPTION OF THE DRAWINGS

The present invention is illustrated by way of example and not limitation in the accompanying figures, in which like references indicate similar elements, and in which.

DETAILED DESCRIPTION

Figure 1:
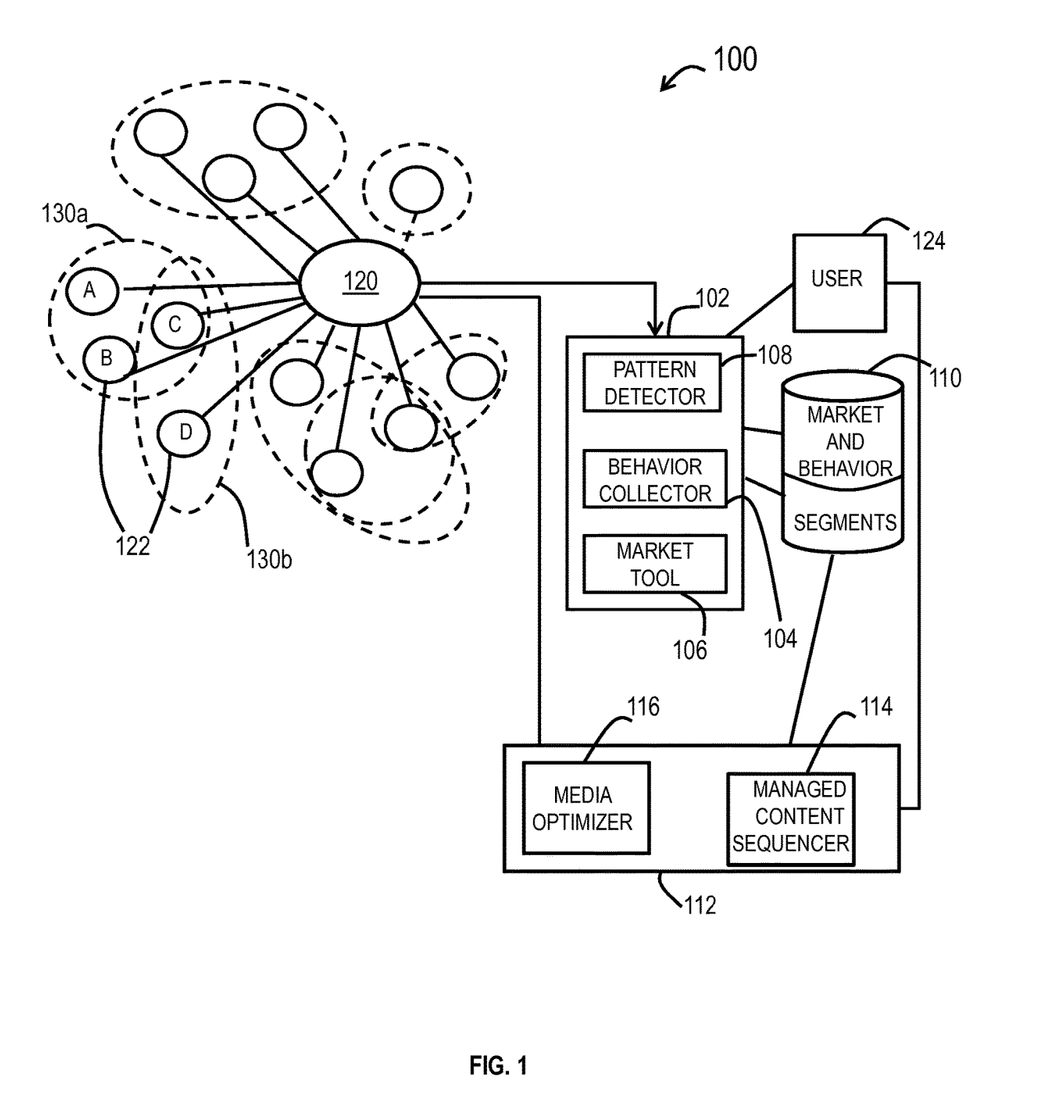
FIG. 1 illustrates a system for collecting, analyzing and segmenting data representing user devices communicating in a communications network, according to certain embodiments of the invention.

Referring to FIG. 1, a system 100 includes a discovery device 102. The discovery device 102 includes or communicatively connects to a behavior collector 104 and a market tool 106. A pattern detector 108 included in or communicatively connected to the discovery device 102 communicatively connects to the behavior collector 104 and the market tool 106. A database 110 is communicatively connected to the behavior collector 104, the market tool 106 and the pattern detector 108.

The system 100 may, but need not necessarily, include or communicatively connect to a marketing engine 112. The marketing engine 112 includes or communicatively connects to a content sequencer 114 and a media optimizer 116.

The discovery device 102 communicatively connects to a communications network 120. The communications network 120 is communicatively connected to the marketing engine 112.

A plurality of communications devices 122 are included in or communicatively connected to the communications network 120. A user device 124 is communicatively connected to the discovery device 102 and, if applicable, the marketing engine 112.

In operation, the discovery device 102 communicatively accesses stores of marketing data from pluralities of marketing systems (not shown in FIG. 1). The marketing systems may be databases and other data stores maintained by server computers operated as or for advertising campaign engines, data management platforms, email service providers, marketing automation platforms (MAPs), customer relationship management platforms (CRMs), web analytics sources, server log files, social networks, and the like. The discovery engine 102 communicatively connects, for example, over the network 120 or other link, to the marketing systems, and obtains interaction and use data for the plurality of communications devices 122 gathered and maintained by the marketing systems.

Each marketing system may maintain use data related to distinct groups of the plurality of communications devices 122. In a non-exclusive example of FIG. 1, the use data of three of the communications devices 122 (A, B and C) are maintained as a group 130a by one marketing system, such as a social network or other (not shown in detail), and the use data of two of the communications devices 122 (C and D) are maintained as a group 130b by another marketing system, such as a web analytics source or other (not shown in detail). It is contemplated that pluralities of the marketing systems will each maintain distinct use data for the particular ones of the communications devices 122 that use, communicate via, access, or otherwise interact with, or are logged or tracked by, the marketing system.

The term "use data" is to be construed broadly to mean any logged, charted, tracked or aggregated data representing interactions, or lack of interactions, of respective users with or to communications devices 122, respectively, as collected, maintained, or ascertained by any one of the marketing system. Non-exclusive examples of use data include any use or lack of use of the communications device 122 in the marketing system that infers or illustrates user characteristics for the user of the device 122. Specific non-exclusive examples include profile, account, demography, geography, likes, posts, clicks, views, searches, and many others.

The discovery device 102 communicatively accesses and collects this use data from the marketing systems. The discovery device 102 may, but need not necessarily, include elements for learning or ascertaining any marketing system within a network or link communicatively connected to the discovery device 102. For example, the discovery device 102 may be communicatively connected to any one or more of the Internet, Intranet(s), proprietary network(s), wide area network(s), local area network(s), or other network or link(s) served by marketing systems, respectively. If applicable elements are included in the discovery device 102, the discovery device 102 searches and finds the marketing systems in the relevant communications network(s).

With respect to the discovery device 102, the behavior collector 104 communicatively access the marketing systems, such as over the Internet or otherwise, to collect use data for the communications devices 122. The collected use data is then analyzed by the market tool 106 to discriminate behavior patterns of the communications devices 122, represented by the use data. In particular, the market tool 108 sorts behavior patterns among the use data, to group respective communications devices of corresponding use data reaching and/or exceeding a threshold versus respective communications devices of corresponding use data falling short of the threshold.

The threshold may be set for the market tool 108 by a user device 124 communicatively connected to the market tool 108. For example, the market tool 108 presents to a communicatively connected user device 124 a graphical or other interface for input of a goal of the operator of the user device 124. Alternatively, or in addition, the goal may be programmed by an administrator of the market tool 106 or otherwise established for the market tool 106. The particular threshold with respect to any grouped communications devices of corresponding use data, is established by the market tool 106 based on the goal.

The pattern detector 108 maps behavior patterns, implicit or inferred, for the grouped communications devices of corresponding use data. For example, if a group of communications devices exhibits use data amounting to or exceeding a particular threshold corresponding to particular goal, and this use data fits a particular programmed behavior pattern for the pattern detector 108, then the pattern detector 108 maps the behavior pattern relative to the group. The mapping may include further segmentation of the group among converters and non-converters, respectively, that is, those communications devices 122 of the group that take particular action or activity and those communications devices 122 of the group that do not take the particular action or activity.

An example result of operations of the discovery device 102, upon operations of the behavior collector 104, market tool 106 and pattern detector 108 for particular goal that establishes particular threshold, follows:

1.) Named (e.g., marketing goal (URL or Event)
   A.) Converter (chosen goal)
      i.) Free behavioral (patterns above threshold)
      ii.) Free behavioral (patterns above threshold)
   B.) Non-Converter (chosen goal)
      i.) Free behavioral (patterns above threshold)
      ii.) Free behavioral (patterns above threshold)

In the example, groupings accord to converter versus non-converter and further segmentation is according to particular behavioral characteristics.

The database 110 is employed by the discovery tool 102 to store collected use data from the marketing systems, together with related communications devices 122 of the use data. For example, the behavior collector 104 communicatively accesses the marketing systems to obtain raw use data representing action or inaction of the communications devices 122 for each marketing system. This raw use data is saved by the behavior collector 104 in the database 110.

The database 110 is also communicatively accessed by the market tool 104 for storage of goals and relation of thresholds corresponding to the goals. The goals may be input by user device(s) 124, and the thresholds may similarly be input or preprogrammed, such as by an administrator of the discovery tool 102. The database 110 further is communicatively accessed by the pattern detector 108 to associate behavior patterns with corresponding groups of communications devices 122 (e.g., segments) and (as hereafter described) to facilitate predictions of future behaviors of those and other communications devices 122.

If a marketing engine 112 is included, the content sequencer 114 of the marketing engine 112 sets sequences for marketing, advertising, or other information content, for distribution according to the segments of behavior determined by the discovery tool 102. The media optimizer 116 of the marketing engine 112 then makes available for delivery to relevant communications devices 122 the particular sequenced content. The media optimizer 116 determines the best type of the media for each communication device 122.

Figure 9:
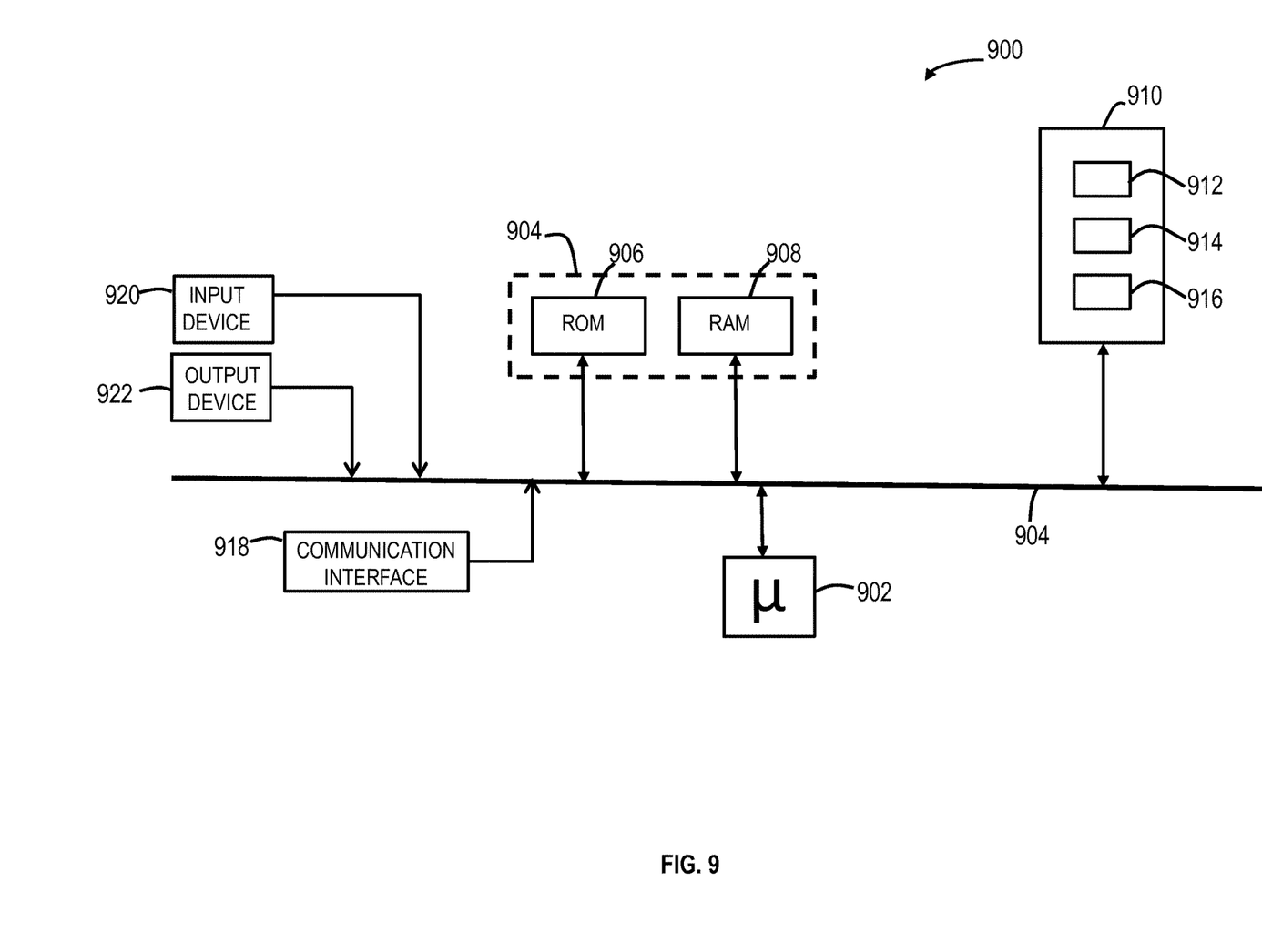
FIG. 9 illustrates a system for collecting, processing and segmenting user devices according to usage data of the devices maintained by marketing systems, according to certain embodiments of the invention.

Referring to FIG. 9, in conjunction with FIG. 1, the system 100 may be hardware components, for example, a processing device with memory and bus, software modules, for example, software stored in a tangible medium and processed by a processor, or combinations. In certain embodiments, the system 100 includes a processing device 900, having a processor 902 and a system bus 904 that couples various system components, for example, memory 904 such as read only memory (ROM) 906 and random access memory (RAM) 908 to the processor 902. The device 900 can include a cache (not shown in detail) of high speed memory communicatively connected to or integrated in the processor 902. The device 900 further includes a storage device 910, for example, a hard disk drive storage, solid state drive (SSD) storage, or other storage. The storage device 910 includes at least one or more software modules 912, 914, 916. The software modules 912, 914, 916 control the processor 902. Alternately, some or all of the software modules 912, 914, 916 can be application specific integrated circuit(s) or device(s) of or communicatively connected to the processor 902.

The software modules may be or include a behavior collector module 912, a market tool module 914, and a pattern detector module 916. The behavior collector module 912 collects use data for communications devices monitored or communicating with platforms or tools for storing such data. For example, the behavior collector module 912 controls the processor 902 to thereby control a communication interface 918 of the device 900. The module 912 controls the processor 902 to communicatively access marketing systems, such as may be accessible over a communications network, for example, the Internet. The module 912 collects use data from the marketing systems via the network, and stores or communicatively accesses data storage, such as a connected database, to store the use data.

The market tool module 914 controls the processor 902 to analyze collected use data of the behavior collector module 912 by the market tool 106, in order to discriminate behavior patterns of communications devices represented by the use data. The market tool module 914, in conjunction with any database, causes the processor 902 to sort behavior patterns among the stored use data, to thereby group respective communications devices of corresponding use data above a threshold versus respective communications devices of corresponding use data falling at or below the threshold. The market tool module 914 receives input via the communication interface 918, for example, from a customer device over a link to the device 900, to set a goal for establishing the threshold. The market tool module 914 stores or communicatively accesses data storage to store as segments, identifiers (such as a respective unique ID, for example, the ID in accordance with the related application referenced above) of user devices of related groups based on discriminated behavior patterns.

The pattern detector module 916 controls the processor 902 to map behavior patterns, implicit or inferred, for the grouped communications devices of corresponding use data. These mapped behavior patterns correspond to the groups of user devices from processing of the market tool module 914. If a group of communications devices exhibits use data above a particular threshold corresponding to particular goal, and this use data fits a particular behavior pattern of the module 916, then the module 916 maps the behavior pattern relative to the group and stores or communicatively accesses data storage to store the pattern. The mapping may include further segmentation of the group among converters and non-converters, respectively The device 900 may additionally include or communicatively connect to various peripheral devices, such as one or more input device 920 and output device 922. These peripheral devices may be employed by an administrator of the system 100 to set or change thresholds, vary pattern detection behavior, retrieve use data, and the like. Although a single one of the device 900 is described, it should be understood that the device 900 may be or include various types of memory, more than one processor or group of cluster of devices networked together, and various peripheral devices. The device 900 may also include operating system, general purpose software, and other hardware and software modules.

Figure 2:
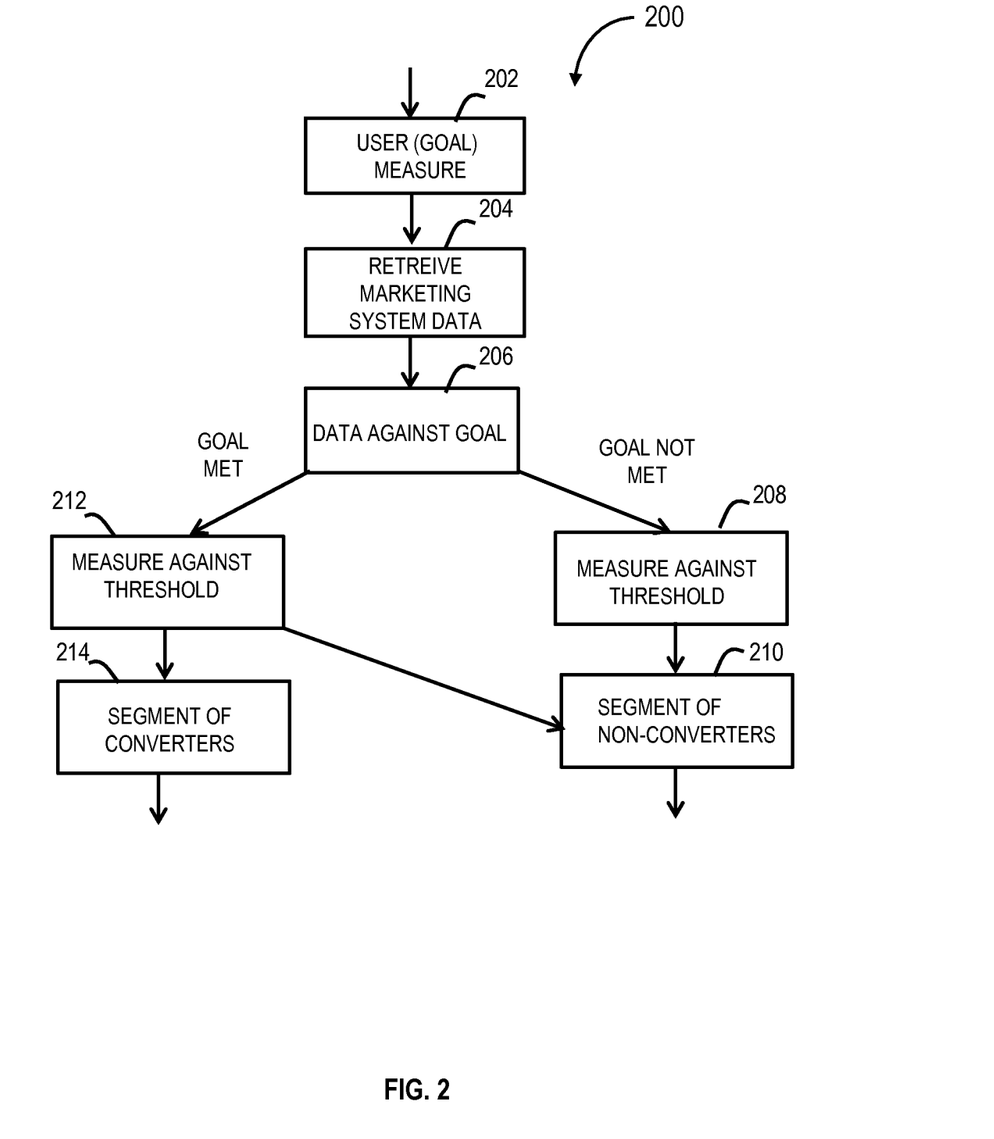
FIG. 2 illustrates a method of segmenting user devices of a communications network according to characteristics of use data of the devices, according to certain embodiments of the invention.

Referring to FIG. 2, a method 200, such as may be performed by the system 100 of FIG. 1 and/or the device 900 of FIG. 9, includes a step 202 of receiving a measurable goal from a customer device communicatively connected to the system 100 or device 900. The measurable goal may be any marketing or business rule or result that the customer device seeks to achieve or implement. Non-exclusive examples of the goal include a rating or level indicating or indicative of customer device registration, downloading, viewing, purchasing, and others.

In a step 204, user data is accessed and retrieved from marketing systems. Access may be via communications network, such as the Internet, dedicated network or link, or otherwise. For each user device corresponding to the user data, the user device is recognized by a unique identifier, such as an identifier assigned to the device by the system, a marketing system, or otherwise. The collected user data from the step 204 is compared against a threshold that is set or preprogrammed relative to the goal from the step 202.

If the threshold corresponding to the goal is not met, a step 208 assigns the user device to a segment of non-converting user devices in the step 210. If the threshold corresponding to the goal is met, a step 212 determines whether behavior patterns of each user device indicate that the user device is converting or non-converting. If the user device is non-converting, its identifier is saved to the segment of non-converters in the step 210. If the use device is converting, its identifier is saved to the segment of converters in the step 214.

Figure 3:
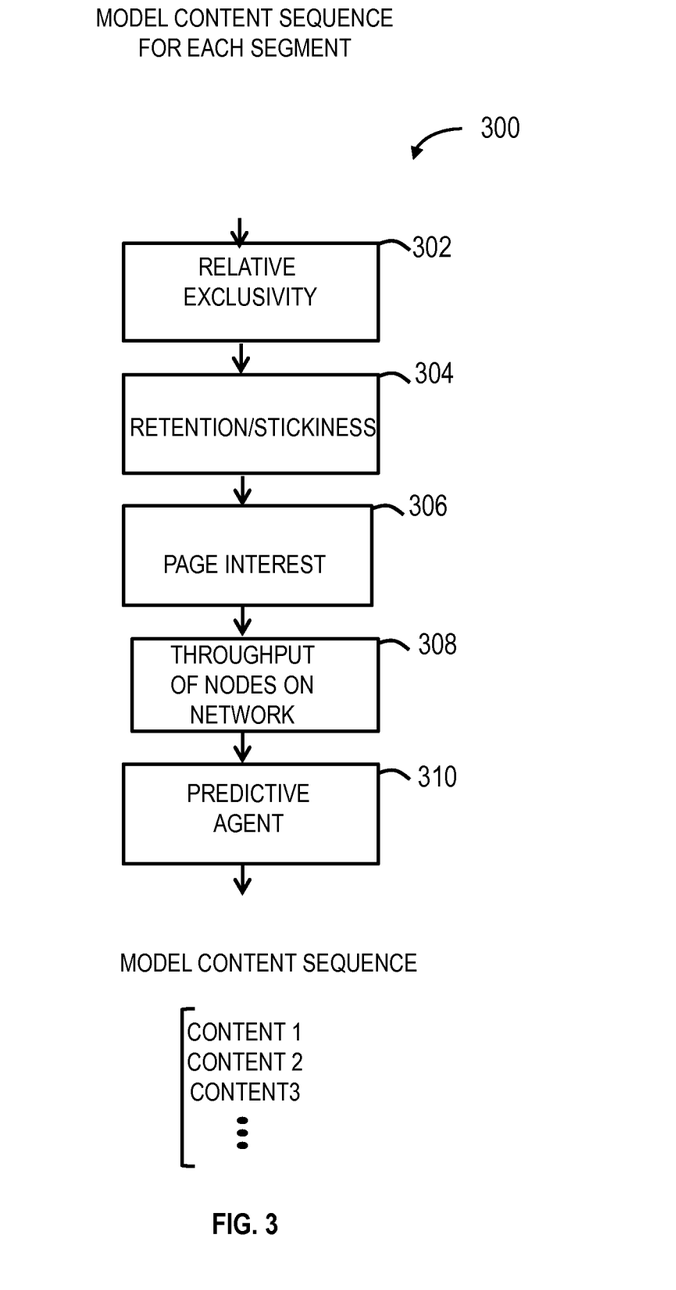
FIG. 3 illustrates a method of modelling content sequences for segments of user devices having related characteristics of use data in a communications network, according to certain embodiments of the invention.

Referring to FIG. 3, for the user devices of the converters segment from the method 200, a method 300 models content sequences for the particular segment. The method 300 may be performed, for example, by the content sequencer 112 of FIG. 1. In the method 300, a series and combination of content performance metrics is measured for the segment. In a step 302, relative exclusivity of the segment, for example, pageviews, visits, and entrances, is measured. A step 304 measures retention/stickiness for the segment, such as bounces, exits, time on and the like.

Further in the method 300, page interest is measured in a step 306. In the step 306, measures for the segment reflect social network "shares", traffic from social networks, and other social network and other network actions. A step 308 measures for the segment the throughput of nodes in the network, for example, the throughput communications activity passing a social network or other network server. Finally, a step 308 performs a predictive agent-based modeling based on aspects or particulars of the segment, such as the measures obtained in the method 300 and segmentation of population in the method 200.

Non-exclusive examples of scorecard results of the method 300 may include the following:
Named Segment
Named Segment Definition
   Converter
      Converter Definition
         Free Behavioral 1

Free Behavioral Definition 1. Content xy55
2. Content gh55
3. Content jk89
4. Content hk65
5. Content as43

Figure 4:
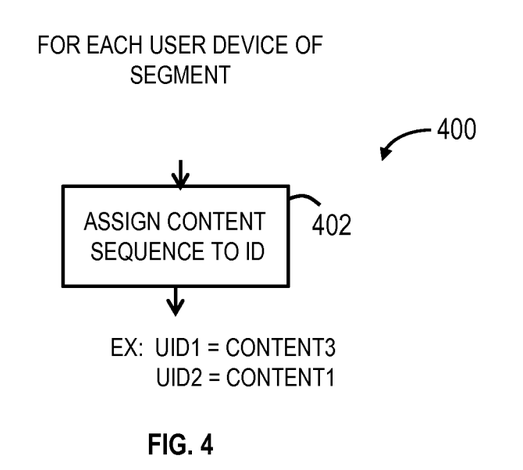
FIG. 4 illustrates a method of assigning a particular content sequence to user devices of a segment characterized by use data of a communications network, according to certain embodiments of the invention.

Referring to FIG. 4, for each user device of the segment and based on the scorecard results, a respective content sequence is assigned in a step 402 to the respective identifier of the user device of the segment. The particular one of the respective content sequence that is assigned in the step 402 depends on content previously delivered to the particular user device of the identifier. For example, each content engagement (i.e., prior content delivery) of a user device of the segment, having a unique identifier, is appended to a record of the unique identifier. In the step 402, a next content sequence, based on the particular content engagement in respect of each unique identifier, is served to the user device of the unique identifier.

Figure 5:
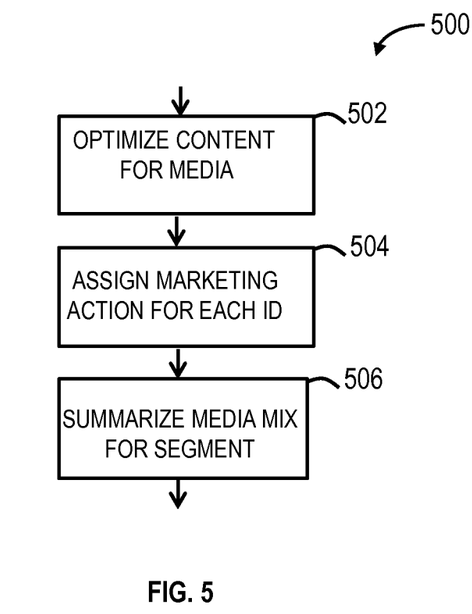
FIG. 5 illustrates a method of optimizing content delivery to user devices of segment, according to characteristics unique to each user device, according to certain embodiments of the invention.

Referring to FIG. 5, a method 500 of delivery of content to user devices of segments, in accordance with the foregoing, includes a step 502 of optimizing content for particular media. In the step 502, assessment is made of combined factors, for example, media applicability (e.g., what mode of receiving and viewing content is applicable for the user device), media performance metrics for the particular unique identifier of the user device, and a frequency limiter determined by the performance of the network and the user device.

Based on the assessment in the step 502, marketing actions are assigned in a step 504 for the particular user device via the unique identifier. The marketing actions assigned in the step 504 determine which media should be used to deliver the next content determined in the method 300. A non-exclusive example of possible marketing actions assigned in the step 504 is as follows:

| Marketing Action | Is Available for the Target If | Historical Perf for this GSC IO | Frequency Limiter |
|---|---|---|---|
| Display & Social Advertising | segment has higher CR for network referrals. Sources and lookalikes prioritized. | .5% CTR | Time Between |
| Search Advertising | segment has higher CR for SEM referrals | .8% CTR | |
| Social Publishing by network | have clicked on a social link or match some demo? | 1 Referal | |
| Retargeting | have retargeting cookie | 2.4% CTR | |
| Email | have email address | 3.4% CTR | |
| Site Serving | always available for next site visit | 4% CTR | |
| A/B Testing | multiple pieces of content have close rankings/sequence | | |

In a step 506, the media mix for each segment is summarized and stored. An example summary of media mix for a particular segment may be as follows:

| Marketing Action | Reach |
|---|---|
| Display & Social Advertising | X,000,000 |
| Search Advertising | X00,000 |
| Social Publishing by network | X0,000 |
| Retargeting | X,000 |
| Email | X0,000 |
| Site Serving | X0,000 |

Figure 6:
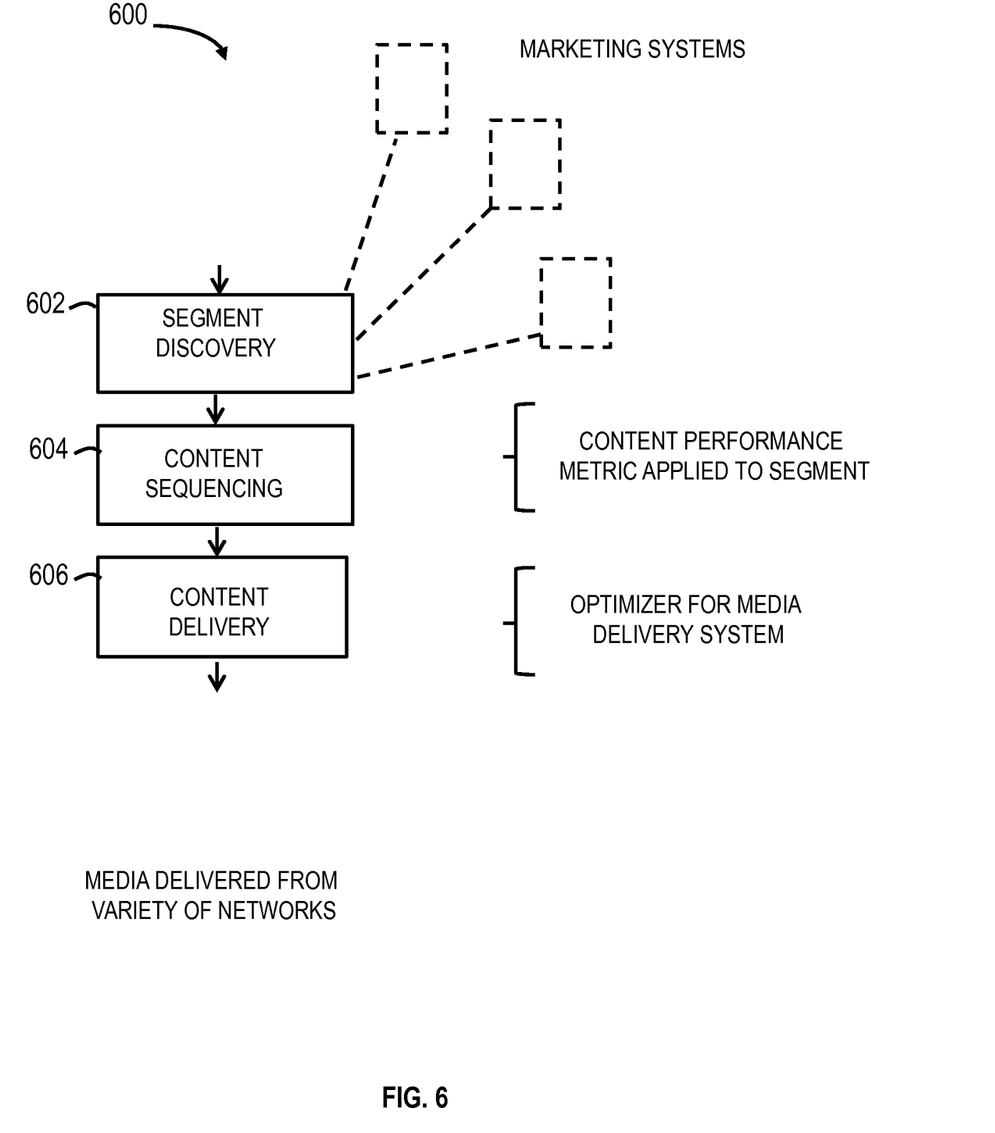
FIG. 6 illustrates a method of discovering segments of user devices via respective unique identifiers of the user devices, the segments relate to behavioral characteristics common among the user devices in a communications network, according to certain embodiments of the invention.

Referring to FIG. 6, a method 600, such as may incorporate some or portions of the foregoing, includes discovering segments 602 of user devices via respective unique identifiers of the devices. The segment discovery in the step 602 may include receiving a user goal, establishing a threshold related to the goal, retrieving user data from marketing systems, grouping user devices (via unique identifier) based on comparison to the threshold, and segmenting the groups into converters and non-converters. For the segment of converters, the step 602 establishes a result for the marketing goal for the segment, distinguishing converters and non-converters and relating the result to specific unique identifiers for user devices of the segment.

In a step 604, content is sequenced for particular segment determined in the step 602. The content is sequenced according to behavioral definitions for converters. The content sequence obtained is associated with the unique identifier for each user device of the segment. The content sequence assures that each next piece or portion of content delivered to the user device follows a desired sequence.

In a step 606, the optimal media for delivery of content is determined for each user device of the segment. Factors are combined in the step 606, for example, media applicability (e.g., what mode of receiving and viewing content is applicable for the user device), media performance metrics for the particular unique identifier of the user device, and a frequency limiter determined by the performance of the network and the user device. The unique identifier for each user device of the segment is correlated with the optimal media as determined in the step 606.

Figure 7:
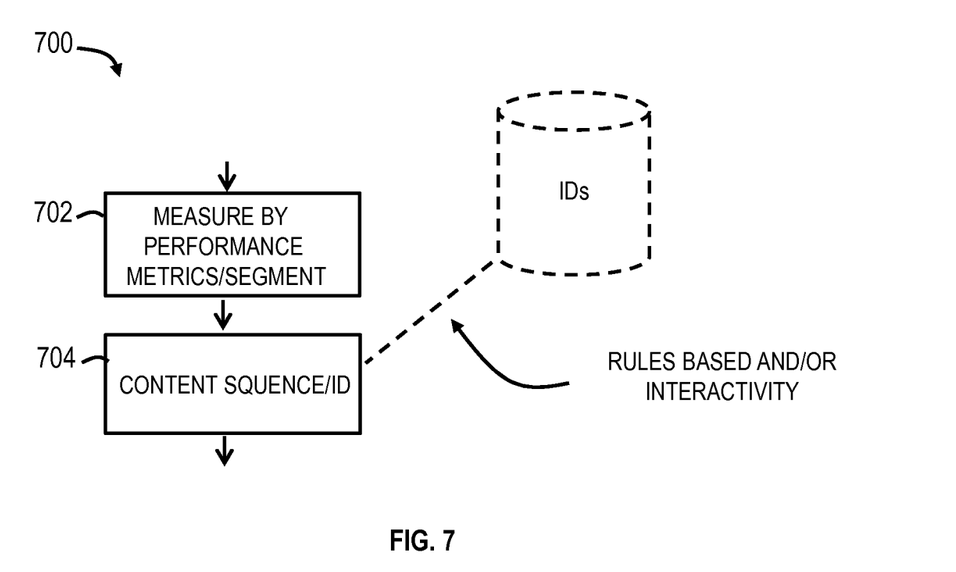
FIG. 7 illustrates a method of measuring performance metrics of user devices of a segment of common behavioral characteristics in a communications network, and using the measured metrics for sequencing content for delivery to the segment, according to certain embodiments of the invention.

Referring to FIG. 7, a method 700 is an example embodiment of the step 604 of the method 600. In the method 700, performance metrics are measured for each segment in a step 702. Then, a content sequence is determined in a step 704 for each unique identifier (i.e., corresponding to respective user devices) of the segment.

Figure 8:
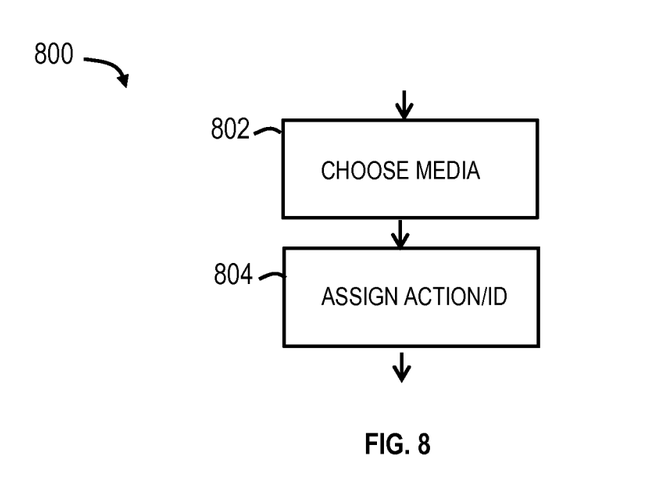
FIG. 8 illustrates a method of optimizing media in which to deliver content to each user device of a segment, the media is optimized for delivery for each respective user device according to unique identifier, according to certain embodiments of the invention.

Referring to FIG. 8, a method 800 is an example embodiment of the step 606 of the method 600. In the method 800, optimal media is ascertained in a step 802. The optimal media is determined for each unique identifier of the segment. In a step 804, content delivery actions are assigned for each unique identifier of the segment.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention.

Benefits, other advantages, and solutions to problems have been described above with regard to specific embodiments. However, the benefits, advantages, solutions to problems and device(s), connection(s) and element(s) that may cause any benefit, advantage, or solution to occur or become more pronounced are not to be construed as a critical, required, or essential feature or element of any or all the claims. As used herein, the terms "comprises, "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system for identifying segments of user devices, the user devices each communicating within at least one respective unique segregated network, each respective unique segregated network includes a respective marketing system, a communications network communicatively connects each of the respective unique segregated networks, the segments of user devices used in operation in respective ones of the respective unique segregated network exhibit use data, respectively, in the respective unique segregated network, comprising:

a discovery device communicatively connected to the communications network, the discovery device searches the communications network to access each of the respective unique segregated network;

a behavior collector communicatively connected to the discovery device interfaces with the respective marketing system of the respective unique segregated network, to collect respective use data of user devices communicating within the respective unique segregated network, the respective use data of the marketing system is proxy for identities of the respective user devices relevant to the respective use data;

a market tool communicatively connected to the behavior collector, the market tool sorts the respective use data to derive behavior patterns of the respective user devices and to group identities of any of the respective user devices exhibiting behavior patterns exceeding a threshold of the market tool;

a pattern detector communicatively connected to the market tool, the pattern detector maps behavior patterns derived from the respective use data exhibiting behavior patterns exceeding the threshold; and a database communicatively connected to the behavior collector, the market tool, and the pattern detector, for storing the respective use data collected from the plurality of marketing systems, the group of the identities of the respective user devices exhibiting behavior patterns exceeding the threshold of the market tool, and behavior patterns associated with the group of the identities of the respective user devices.

2. The system of claim 1, further comprising:

a model content sequencer communicatively connected to the database, for assigning content for sequential delivery to the respective user devices of the group; and a media optimizer communicatively connected to the model content sequencer, for determining a preferential communications mode for delivery of the content assigned for sequential delivery to each of the respective user devices of the group.

3. A system for identifying segments of user devices having related characteristics of use in communications within at least one respective unique segregated network of respective user devices authorized for communicating on the respective unique segregated network, each respective unique segregated network includes a respective marketing system, collecting respective use data derived from use in communications by the respective user devices within the at least one respective unique segregated network, a communications network communicatively connects each of the respective unique segregated networks, comprising:

memory containing a set of instructions;

a database for storage of the respective use data of, and relating patterns of behavior exhibited by the respective use data in, respective groups of the user devices of the segments; and a processor communicatively connected to the communications network, the memory and the database, for processing the set of instructions including instruction for:

discovering by the processor by search of the communications network the respective unique segregated networks;

interfacing by the processor with the respective marketing systems;

collecting by the processor, via communicating over the communications network, from each of the respective marketing systems, the respective use data of the respective marketing system corresponding to respective user devices in the respective groups;

storing by the processor the respective use data in the database;

sorting by the processor the respective use data to identify respective behavioral patterns common to the respective groups;

storing by the processor in the database the identities of the respective user devices of the respective groups as identified segments;

mapping by the processor the behavioral patterns for each of the identified segments based on the respective use data of the respective group; and assigning by the processor a sequence of message content for delivery to the user devices of each respective group, based on the mapping of the behavioral patterns for the group.

4. The system of claim 3, further comprising the set of instructions including instruction for:

uniquely identifying by the processor each respective user device of each respective group;

storing by the processor a respective unique identifier in the database for each respective user device, relative to the respective group of the respective user device;

tracking by the processor status of sequence of message content delivered to each respective user device; and storing by the processor in the database, relative to each respective unique identifier, status of sequence tracked.

5. The system of claim 4, further comprising:

media memory;

a media processor communicatively connected to the database and the media memory, for processing a set of media instructions including instruction for:

modelling by the media processor sequence of message content based on behavioral patterns of each respective group;

storing by the media processor in the media memory each sequence of message content relative to the respective unique identifier for the respective user devices of the respective group.

6. The system of claim 5, further comprising the set of instructions including instruction for:

determining by the media processor a respective preferred communication link of the communication network for delivery of message content to respective user devices of the respective group.

7. The system of claim 6, wherein the media processor is same as the processor and the media memory is the database.

8. A method, comprising:

discovering by the processor, via communicating over the communications network, a plurality of respective unique segregated networks of respective user devices authorized for communicating on the respective unique segregated network;

interfacing by the processor with respective marketing systems of the plurality of respective unique segregated networks;

collecting by the processor, via communicating over the communications network, from the respective marketing systems of the respective unique segregated network, respective use data of communications of the respective user devices in the respective unique segregated networks, the respective use data of the marketing system is proxy for identities of the respective user devices relevant to the respective use data;

storing by the processor the respective use data in a database;

sorting by the processor the respective use data to identify behavioral patterns common to respective groups of the respective user devices of the respective use data;

storing by the processor the respective groups in the database;

mapping by the processor the behavioral patterns for each of the respective groups based on the respective use data of the group; and assigning by the processor a sequence of message content for delivery to select ones of the respective user devices of each respective group, based on the mapping of the behavioral patterns for the respective group.

9. The method of claim 8, further comprising:

uniquely identifying by the processor each respective user device of each respective group;

storing by the processor a respective unique identifier in the database for each user device of each respective group, relative to the group of the user device;

tracking by the processor a status of sequence of message content delivered to each user device of each respective group; and storing by the processor in the database, relative to each respective unique identifier, the status of sequence tracked.

10. The method of claim 9, further comprising:

modelling by a media processor a sequence of message content based on respective behavioral patterns of each respective group;

storing by the media processor in a media memory each sequence of message content relative to the respective unique identifier for the respective user devices of the respective group.

11. The method of claim 10, further comprising:

determining by the media processor a respective preferred communication link of the communication network for respective user devices of the respective group, for delivery of message content to the respective user devices of the respective group.

12. The method of claim 11, wherein the media processor is the processor and the media memory is the memory.

13. A method for identifying segments of a population of user devices exhibiting comparable behavioral patterns within at least one of a plurality of respective unique segregated networks, the respective unique segregated networks each include a respective marketing system, each of the respective marketing systems includes respective use data corresponding to the population communicating within the respective unique segregated network of the respective marketing system, comprising:

discovering by a processor the at least one of the plurality of respective unique segregated networks;

access by the processor the respective marketing systems of the plurality of respective unique segregated networks;

collecting by the processor from the respective marketing systems of the at least one of the plurality of respective unique segregated networks the respective use data for the population, the respective use data is proxy to identity of the user devices of the population;

determining by the processor if the respective use data exceeds a threshold for particular behavioral pattern of interest;

for the respective use data, determining by the processor a unique identifier for each user device of the use data;

grouping by the processor in a database, the respective use data in relation to the unique identifier, for each user device of the use data that exceeds the threshold; and mapping by the processor in the database, the behavioral pattern of the respective use data for each user device of the use data that exceeds the threshold.

14. The method of claim 13, further comprising:

storing by the processor as a respective segment in the database, the behavioral pattern in relation to the unique identifier of each user device of the use data that exceeds the threshold.

15. The method of claim 14, further comprising:

establishing by a media processor a content sequence for sequential delivery to the user devices of the respective segment, based on the behavioral pattern for the respective segment in the database; and setting a particular content of the content sequence for next delivery to each respective one of the user devices of the respective segment, the unique identifier of each user device of the segment is related to the particular content to ensure sequential delivery of the content sequence notwithstanding intermittent interruption of delivery of any of the particular content for next delivery.

16. The method of claim 15, further comprising:

determining by the media processor a respective preferred mode of delivery of the content sequence in the communications network, for each respective one of the user devices of the segment.

17. The method of claim 15, wherein the processor is same as the media processor.

* * * * *